United States Patent
Schneider (10) Patent No.: US 9,827,844 B2
(45) Date of Patent: Nov. 28, 2017

(54) AIR CONDUCTING APPARATUS FOR OUTGOING AIR GUIDANCE

(71) Applicant: Dr. Ing. h.c. F. Porsche Aktiengesellschaft, Stuttgart (DE)

(72) Inventor: Klaus Schneider, Tiefenbronn (DE)

(73) Assignee: Dr. Ing. h.c.f. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/788,849

(22) Filed: Jul. 1, 2015

(65) Prior Publication Data

US 2016/0009170 A1    Jan. 14, 2016

(30) Foreign Application Priority Data

Jul. 14, 2014    (DE) .......................... 10 2014 109 811

(51) Int. Cl.
| | | |
|---|---|---|
| *B60K 11/04* | (2006.01) | |
| *B60K 11/08* | (2006.01) | |
| *F01P 11/10* | (2006.01) | |

(52) U.S. Cl.
CPC .............. *B60K 11/08* (2013.01); *B60K 11/04* (2013.01); *F01P 11/10* (2013.01); *B60Y 2304/05* (2013.01); *F01P 2050/22* (2013.01)

(58) Field of Classification Search
CPC ......... B60K 11/08; B60K 11/04; B60K 11/06; B60K 2001/003; B60K 13/06; F01P 11/10; F01P 2050/22
See application file for complete search history.

(56) References Cited

U.S. PATENT DOCUMENTS

| | | | | | |
|---|---|---|---|---|---|
| 2,709,967 | A | * | 6/1955 | Dilworth ................... | B61C 5/02 105/35 |
| 4,604,974 | A | * | 8/1986 | Watanabe ................ | F01P 11/10 123/41.01 |
| 4,673,206 | A | * | 6/1987 | Kretschmer ......... | B62D 35/005 296/180.1 |
| 4,723,594 | A | * | 2/1988 | Koehr .................... | B60K 11/04 123/196 AB |
| 4,810,021 | A | * | 3/1989 | Burst ....................... | B60T 5/00 296/180.1 |
| 4,979,584 | A | * | 12/1990 | Charles ................. | B60K 11/04 165/121 |
| 5,141,068 | A | * | 8/1992 | Mendicino ............. | B60K 13/06 180/68.3 |

(Continued)

FOREIGN PATENT DOCUMENTS

| | | | | |
|---|---|---|---|---|
| DE | EP 0535255 | A1 * | 4/1993 | ............. B60K 11/00 |
| DE | 102 42 788 | | 3/2004 | |

(Continued)

OTHER PUBLICATIONS

German Search Report dated Apr. 30, 2015.

*Primary Examiner* — Hau V Phan
*Assistant Examiner* — Steve Clemmons
(74) *Attorney, Agent, or Firm* — Gerald E. Hespos; Michael J. Porco; Matthew T. Hespos (57) ABSTRACT

A mid-mounted radiator in a motor vehicle has at least one outgoing air guide attached laterally on the left and right of the radiator. In vehicles with a relatively low cooling requirement, the lateral outgoing air guides are removed and the openings are closed by a cover.

11 Claims, 6 Drawing Sheets

(56) References Cited

U.S. PATENT DOCUMENTS

| | | | | |
|---|---|---|---|---|
| 5,193,609 A * | 3/1993 | Cowart | ............ | B60H 1/00521 |
| | | | | 165/122 |
| 5,495,909 A * | 3/1996 | Charles | ............... | B60H 1/3227 |
| | | | | 123/41.66 |
| 5,588,482 A * | 12/1996 | Holka | .................. | B60K 11/08 |
| | | | | 123/41.49 |
| 5,660,149 A * | 8/1997 | Lakerdas | ................ | F01P 5/06 |
| | | | | 123/41.01 |
| 6,142,213 A * | 11/2000 | Gallivan | ................ | F01P 11/10 |
| | | | | 123/41.49 |
| 7,537,072 B2 * | 5/2009 | Sturmon | ............... | B60K 11/08 |
| | | | | 165/51 |
| 8,474,557 B2 * | 7/2013 | Wolf | ........................ | B60T 5/00 |
| | | | | 180/68.1 |
| 8,960,619 B2 * | 2/2015 | Lecroq | .................. | B60K 11/04 |
| | | | | 165/51 |
| 2004/0124022 A1 * | 7/2004 | Schmid | ................ | B60K 11/08 |
| | | | | 180/68.1 |
| 2012/0071075 A1 * | 3/2012 | Wolf | ........................ | B60T 5/00 |
| | | | | 454/162 |
| 2015/0298540 A1 * | 10/2015 | Matsubara | ............ | B60K 13/02 |
| | | | | 293/113 |

FOREIGN PATENT DOCUMENTS

| | | | | |
|---|---|---|---|---|
| DE | 102007062345 A1 * | 6/2009 | ............... | F01P 3/18 |
| DE | 20 2008 009 178 | 12/2009 | | |
| DE | WO 2010003717 A1 * | 1/2010 | ............... | F01P 5/06 |
| DE | 10 2009 027 475 | 9/2010 | | |
| DE | 102010038350 A1 * | 2/2012 | ............ | B60K 11/04 |

* cited by examiner

AIR CONDUCTING APPARATUS FOR OUTGOING AIR GUIDANCE

CROSS REFERENCE TO RELATED APPLICATION

This application claims priority under 35 USC 119 to German Patent Appl. No. 10 2014 109 811.0 filed on Jul. 14, 2014, the entire disclosure of which is incorporated herein by reference.

BACKGROUND

1. Field of the Invention

The invention relates to an air conducting apparatus for outgoing air guidance to mid-mounted radiator held in a surrounding radiator frame of a motor vehicle.

2. Description of the Related Art

DE 10 2009 027 475 discloses an air conducting apparatus for conducting air to a radiator of a motor vehicle. The apparatus has first and second air conducting part. The first air conducting part is a closing part and the second air conducting part is a funnel that forms an air duct and feeds air to the radiator.

It is an object of the invention to provide a modular air conducting apparatus for outgoing air guidance from a mid-mounted radiator of a motor vehicle that is of modular construction, that can be used for different vehicle types, that can keep the aerodynamic loss at a minimum and/or that can adapt to the requirements as needed.

SUMMARY OF THE INVENTION

The invention relates to an air guiding device that has outgoing air guides and that can be inserted into the vehicle in a variable manner behind a vehicle radiator so that the radiator outgoing air can be conducted away to the outside in a targeted manner depending on the cooling performance and/or the required air throughput.

The air guiding device has a central outgoing air guide that is formed by the radiator frame. The air guiding device is connected in an air-conducting manner via frame-side outgoing air openings to two outgoing air guides that are formed by a funnel-shaped air conducting element. Each air conducting element may be arranged laterally of the radiator frame in such a way that the frame-side outgoing air openings can be closed by a cover if an air conducting element is not needed. The additional outgoing air guides are configured as air conducting parts on the side walls of the radiator frame and enable a great air throughput. If less cooling is needed, the air conducting elements can be removed in a simple way and the outgoing air openings in the radiator frame can then be closed by covers. Thus, a modular application for different vehicles is possible.

The radiator frame may have clip receptacles for upper and lower pins or tube parts of the radiator. Thus, the radiator is positioned to form the central outgoing air guide of triangular cross section with a lower-side that is open between the radiator and a wall of the radiator frame. The clipped connection on the radiator frame ensures the radiator is held reliably in the radiator frame to form the central outgoing air guide.

Each radiator-side outgoing air opening may be arranged in the side walls of the radiator frame. Covers may be clipped to the radiator frame if any of the air conducting elements is omitted.

Each air conducting element may have an air outlet opening that is directed down toward air openings in the front part of the vehicle. Thus, radiator outgoing air can flow away without obstacles behind the radiator. The central air outlet opening formed by the radiator frame also may be directed toward air openings in the front part.

The air conducting elements may comprise elongate, air ducts that form the outgoing air guides with lateral air outlet openings. The air ducts may be oriented approximately horizontally and may extend transversely in the vehicle toward respective orifice openings in a side region of the front part so that a free end of each air duct is in one of the orifice openings. Furthermore, the orifice opening on each side of the front part and the air outlet openings that corresponds thereto may be in a region of high flow velocity and may be subjected to a corresponding negative pressure.

This embodiment increases the air throughput without having a negative influence on the aerodynamics of the vehicle. Instead of the covers or the funnel-shaped outgoing air guides, air ducts that lead part of the outgoing air away to the side are attached at the same point. The air outlet then may lie on the front part in a region of high flow velocity and therefore negative pressure. The pressure difference that prevails between the radiator and the opening region compensates partially for the flow loss of the relatively long air duct, but also leads to an increased (output) flow. Thus, the overall air throughput through the radiator and the cooling performance are increased without having a negative influence on lift. An output flow downward out of the central region of the radiator is maintained, as is also the case in the other design variants. However, the additional air quantity takes a different path.

Seals may be arranged on the underside of the radiator frame in the region of the frame side walls to seal the radiator and the radiator frame with respect to the front part. The seals may run on the radiator underside in a manner that adjoins a seal that is arranged on a sealing strip that lies transversely. The seals may lie on the front part.

One exemplary embodiment of the invention is shown in the drawings and will be described in greater detail in the following text.

DETAILED DESCRIPTION

Air guidance for guiding outgoing air from a mid-mounted radiator 1 of a motor vehicle to the outside takes place via outgoing air guides 2, 3, 4 that are connected in an air-conducting manner to the mid-mounted radiator 1 directly on a rear side.

The mid-mounted radiator 1 is held in a radiator frame 5 that forms a central outgoing air guide 2 between a rear side 6 of the radiator 1 and an inner wall 7 of the radiator frame 5. In a variant I, in addition to the outgoing air guide 2, at least two further outgoing air guides 3 and 4 can be arranged on the radiator frame 5. The outgoing air guides 3 and 4 are formed by funnel-shaped air conducting elements 8, 9 that are connected in an air-conducting manner to the central outgoing air guide 2 via frame-side outgoing air openings 10, 11.

The funnel-shaped air conducting elements 8, 9 optionally are arranged laterally of the radiator frame 5 so that the frame-side outgoing air openings 10, 11 can be closed off in each case via a cover 12, 14 in the case of an omission of the air conducting elements 8, 9, according to variant II.

Figure 1:
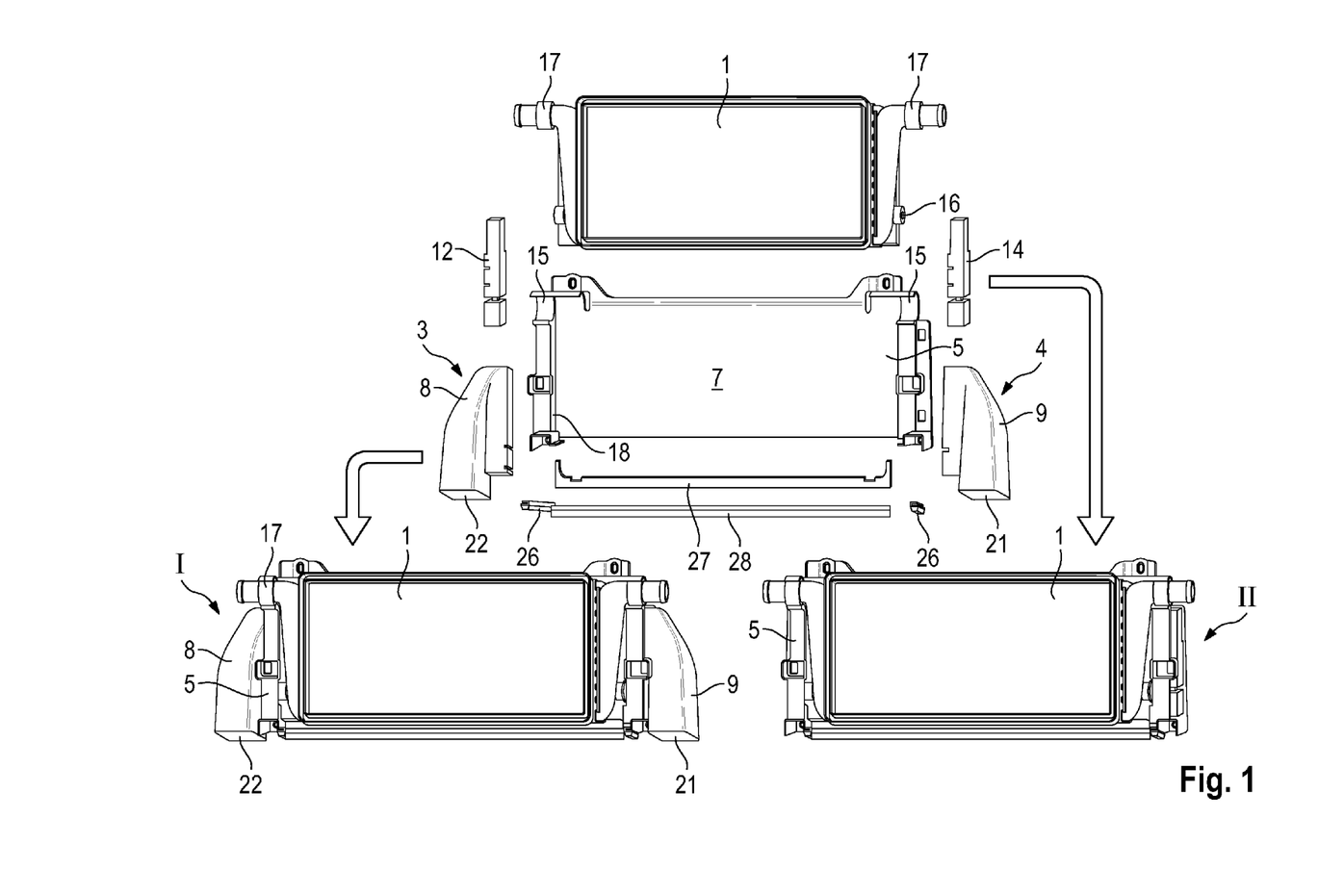
FIG. 1 shows two variants I and II of the outgoing air guides of the mid-mounted radiator with radiator frame and air conducting elements and cover.
Figure 2:
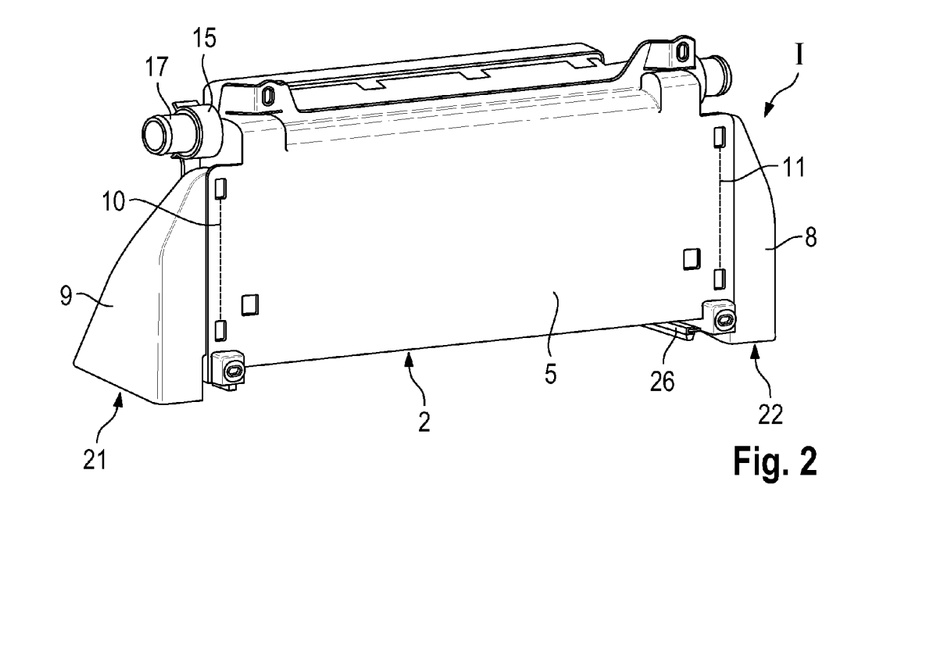
FIG. 2 is a view of variant I with the radiator held in the radiator frame and the lateral outgoing air guides that are configured as air conducting elements.
Figure 2A:
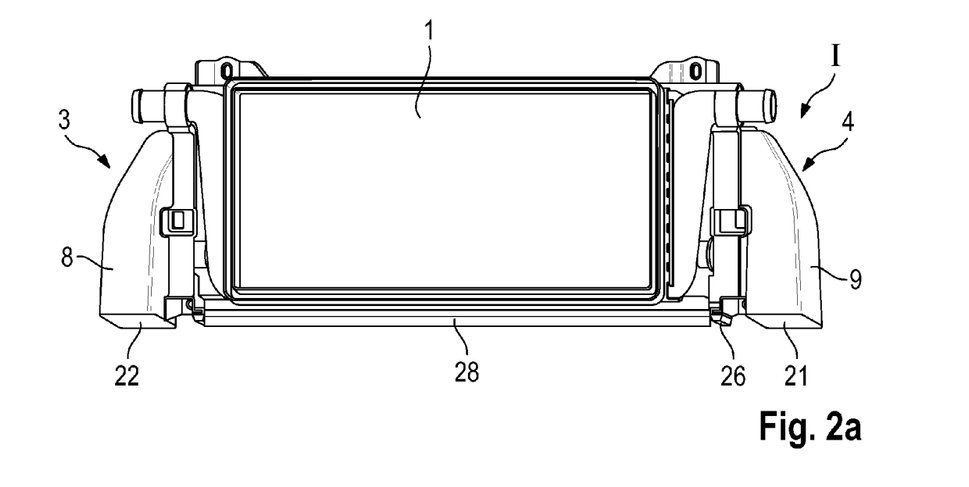
FIG. 2a is a front view of the radiator in the radiator frame of variant I.
Figure 3:
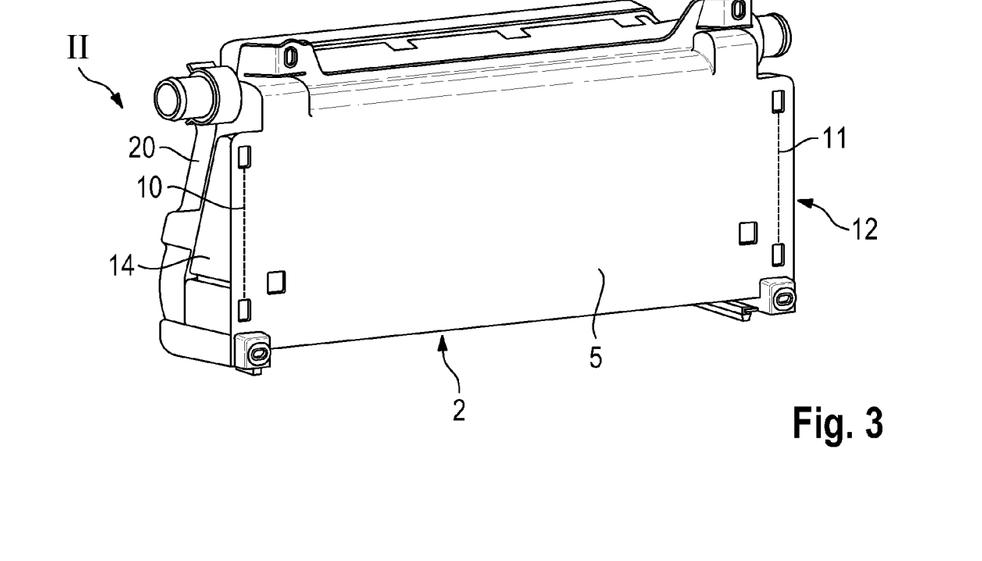
FIG. 3 is a view of variant II of the mid-mounted radiator held in the radiator frame without lateral outgoing air guides of the air conducting elements, but with a cover that closes the outgoing air openings.

FIG. 1 shows variant I of the mid-mounted radiator with the attached funnel-shaped air conducting elements 3 and 4 and variant II without the air conducting elements 3, 4. The frame-side outgoing air openings 10, 11 are closed via a cover 12, 14 if air conducting elements 3, 4 is not present.

Figure 4:
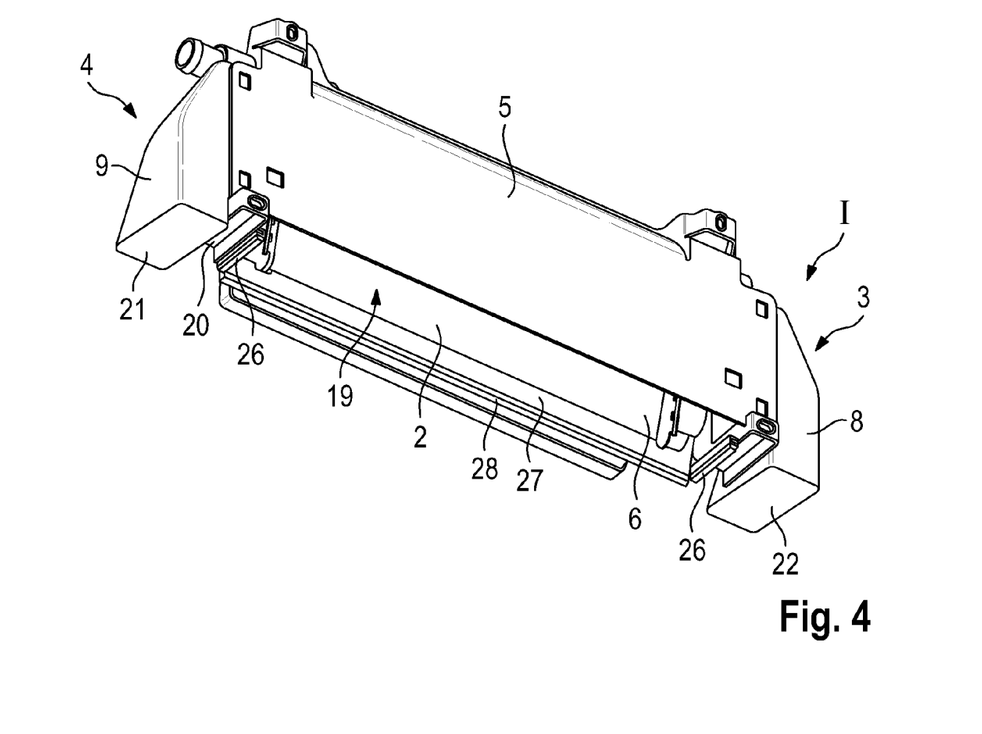
FIG. 4 is a view of variant I of the mid-mounted radiator, as viewed partially from below into the central outgoing air guide.

The radiator frame 5 has clip receptacles 15, 18 to receive upper and lower pins or tubes 17, 16 of the radiator 1 and to define a space of triangular cross section between the radiator 1 and a wall 7 of the radiator frame 5, with the central outgoing air guide 2 opening to the space at a lower-side air outlet opening 19 (FIG. 4).

Figure 5:
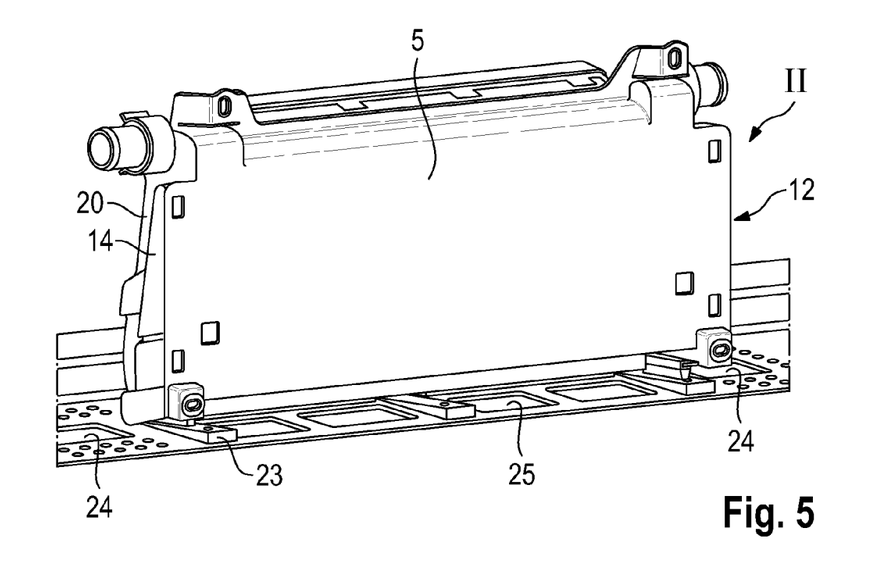
FIG. 5 is a view of the mid-mounted radiator held by clips in the radiator frame, with the air openings in a front part for the outgoing air guides according to variant I.
Figure 6:
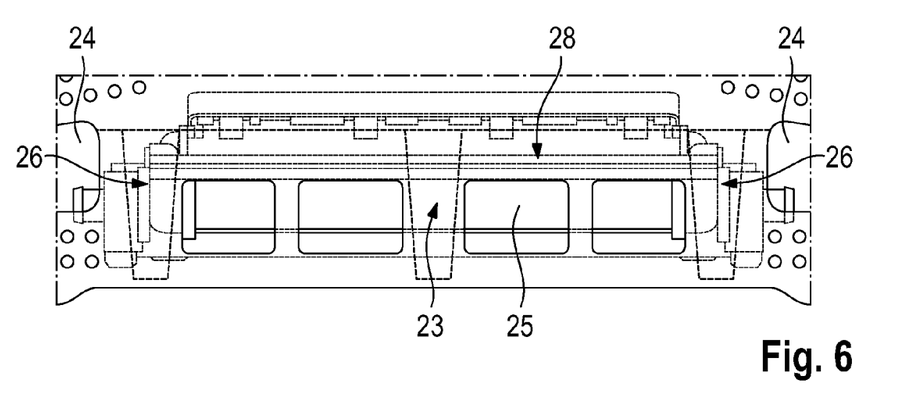
FIG. 6 is a view from below of the seal profile of the mid-mounted radiator with radiator frame, as viewed from the front part.

The frame-side outgoing air openings 10, 11 are arranged in each case in the side walls 20 of the radiator frame 5. The side walls 20 of variant I are fit with the air conducting elements 3, 4 and those of variant II are clip to the covers 12, 14. To conduct the outgoing air away from the rear of the radiator 1, the air conducting elements 8, 9 may have downwardly oriented air outlet openings 21, 22 that are directed toward air openings 24 in the front part 23 of the vehicle (FIGS. 5 and 6).

The central air outlet opening 19 is formed by the radiator frame 5 and is directed toward air openings 25 in the front part 23 for discharging radiator outgoing air.

Figure 7:
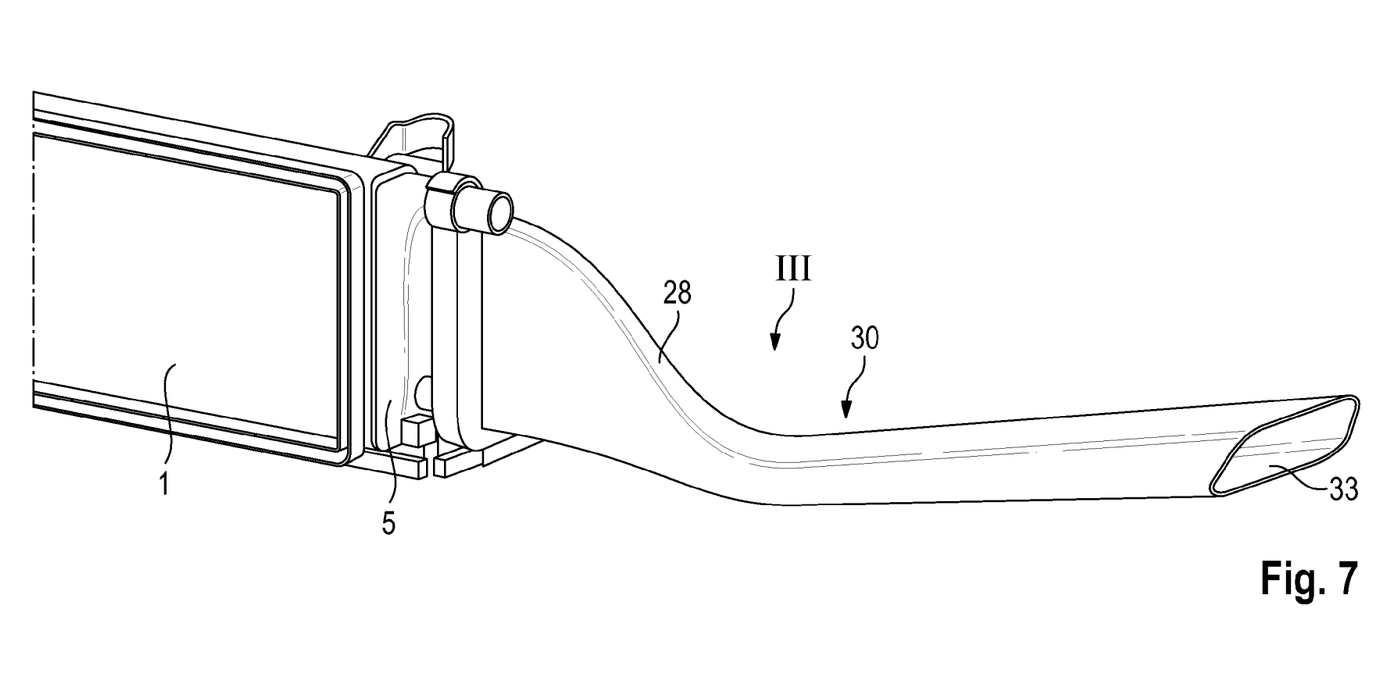
FIG. 7 is a view of a design variant III of the air conducting apparatus with an elongate air conducting duct and a lateral orifice opening in the front part.
Figure 8:
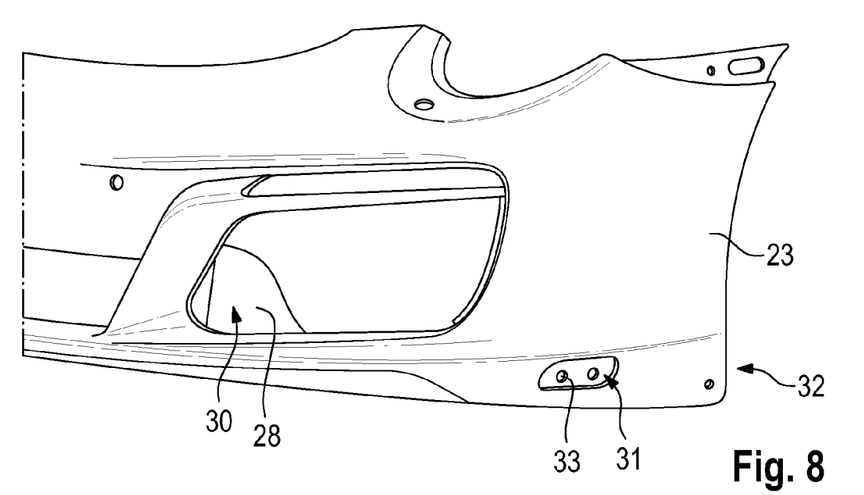
FIG. 8 is a front view of the front part with the installed elongate air duct and a lateral orifice opening in the front part.
Figure 9:
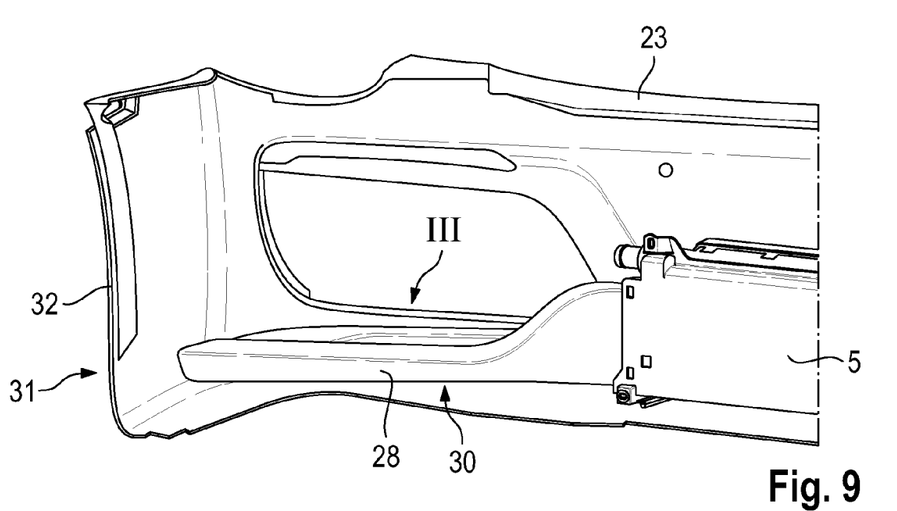
FIG. 9 is a rear view of the front part with the installed elongate air duct.

FIGS. 7, 8 and 9 show a third design variant III with an elongate, duct-like air conducting element 28 that can be used instead of the funnel-shaped air conducting elements 8, 9. The air conducting element 28 is directed toward an orifice opening 31 in the front part 23, and its free end has an air outlet opening 33. The air conducting element 28 is arranged on each side of the radiator frame 5. Only one side with one air conducting element 28 is shown in the drawing.

The air conducting elements 28 comprise elongate air ducts that form the outgoing air guides 30 with the lateral air outlet openings 33. The air ducts are oriented so as to run approximately horizontally and transversely in the vehicle. The orifice openings 31 in the front part 23 and the end-side air outlet openings 33 of the air ducts are arranged in the side region 32 of the front part 23 and lie in a region of high flow velocity, in which a correspondingly high negative pressure prevails. In the case of an omission of the air conducting elements 28, the frame-side outgoing air openings 10, 11 are closed by the covers 12, 14.

Seals 26 are arranged on the underside of the radiator frame 5 in the region of the frame side walls 20. The seals 26 run on the underside of the radiator 1, which lies on the front part 23, in a manner that adjoins a seal 28 arranged on a sealing strip 27 that runs transversely.

What is claimed is:

1. An air conducting apparatus for guiding outgoing air from a radiator of a motor vehicle, the radiator having a rear side, the air conducting apparatus comprising:
   a radiator frame substantially surrounding and holding the radiator, the radiator frame being formed with a rear wall opposed to and spaced rearward of the rear side of the radiator and opposite side walls extending between the rear wall and the radiator to define a central outgoing air guide between the rear wall of the radiator frame and the rear side of the radiator, and outgoing air openings communicating with the central outgoing air guide, the outgoing air openings including a lower air outlet opening aligned for directing at least part of air passing through the radiator down toward a roadway surface and opposite side air outlet openings in the side walls of the frame; and
   a plurality of air flow control members, the air flow control members comprising:
   downwardly oriented air conducting elements configured for mounting respectively to the side walls of the radiator frame, the downwardly oriented air conducting elements having inlets communicating with the opposite side air openings of the radiator frame and outlets that open down;
   laterally oriented air conducting elements configured for mounting respectively to the side walls of the radiator frame, the laterally oriented air conducting elements having inlets communicating with the opposite side air openings of the radiator frame and outlets that open laterally of the radiator frame and in a side region of the motor vehicle; and
   covers configured for covering the opposite side air outlet openings of the radiator frame, wherein
   selected ones of the downwardly oriented air conducting elements, the laterally oriented air conducting elements and the covers are mounted to the radiator frame in accordance with radiator cooling requirements.

2. The air conducting apparatus of claim 1, wherein the downwardly oriented air conducting elements are funnel-shaped and have downwardly oriented widened air outlets directed toward air openings in a front part of the vehicle.

3. The air conducting apparatus of claim 1, wherein the central outgoing air guide is of triangular cross section and the lower air outlet opening is between the radiator and the rear wall of the radiator frame.

4. The air conducting apparatus of claim 3, wherein the lower air outlet opening formed in the radiator frame is directed toward air openings in a front part of the vehicle.

5. The air conducting apparatus of claim 1, wherein the laterally oriented air conducting elements are elongate outgoing air ducts oriented in the vehicle to run approximately horizontally and transversely at positions aligned with a lower part of the central outgoing air guide, and the outlet of each of the air ducts communicating with an orifice opening in a side region of a front part of the vehicle.

6. The air conducting apparatus of claim 5, wherein the orifice openings in the side region of the front part of the vehicle are arranged in a region of high flow velocity and a corresponding negative pressure.

7. The air conducting apparatus of claim 1, wherein the air conducting elements or the covers are clipped to the radiator frame.

8. The air conducting apparatus of claim 1, wherein the radiator frame further comprises clip receptacles for receiving upper and lower pins or tube parts of the radiator and positioning the radiator in the radiator frame.

9. The air conducting apparatus of claim 1, further comprising seals on an underside of the radiator frame in a region of the frame side walls, the seals adjoining a seal on a transverse sealing strip.

10. An air conducting apparatus for guiding outgoing air from a radiator of a motor vehicle that has a front part with a bottom wall facing a roadway surface and opposite side regions extending up from the bottom wall, the radiator being above the bottom wall of the front part of the vehicle and between the side regions thereof, the radiator having a rear side, the air conducting apparatus comprising:

a radiator frame substantially surrounding and holding the radiator, the radiator frame being formed with a rear wall opposed to and spaced rearward of the rear side of the radiator and opposite side walls extending between the rear wall and the radiator to define a central outgoing air guide between the rear wall of the radiator frame and the rear side of the radiator, and outgoing air openings communicating with the central outgoing air guide, the outgoing air openings including a lower air outlet opening aligned for directing at least part of air passing through the radiator down through at least one central opening in the bottom wall of the front part and toward the roadway surface and opposite side air outlet openings in the side walls of the frame; and a plurality of air flow control members, the air flow control members comprising:

downwardly oriented air conducting elements configured for mounting respectively to the side walls of the radiator frame, the downwardly oriented air conducting elements having inlets communicating with the opposite side air openings of the radiator frame and outlets that communicate with lateral openings in the bottom wall of the front part of the vehicle;

laterally oriented air conducting elements configured for mounting respectively to the side walls of the radiator frame, the laterally oriented air conducting elements having inlets communicating with the opposite side air openings of the radiator frame and outlets that communicate with lateral openings in the side regions of the front part; and covers configured for covering the opposite side air outlet openings of the radiator frame, wherein selected ones of the downwardly oriented air conducting elements, the laterally oriented air conducting elements and the covers are mounted to the radiator frame in accordance with radiator cooling requirements.

11. The air conducting apparatus of claim 10, wherein the laterally oriented air conducting elements are elongate outgoing air ducts oriented in the vehicle to run approximately horizontally and transversely at positions aligned with a lower part of the central outgoing air guide, and the outlet of each of the air ducts communicating with an orifice opening in a side region of a front part of the vehicle.

* * * * *